Patented Dec. 7, 1948

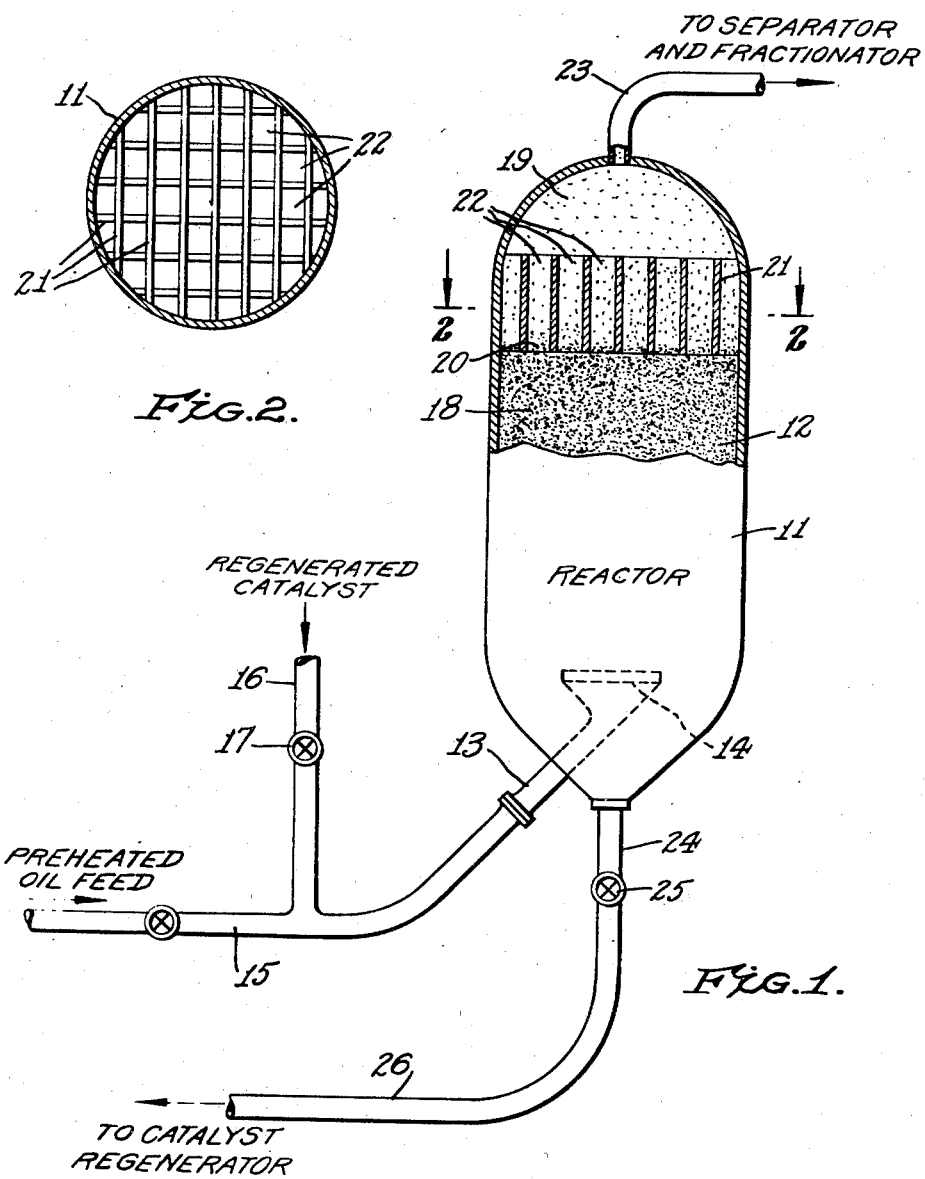

2,455,561

UNITED STATES PATENT OFFICE 2,455,561

REDUCING DISENGAGING HEIGHT IN FLUIDIZED POWDER SYSTEMS

George D. Creelman, Cleveland Heights, Ohio, assignor to The M. W. Kellogg Company, New York, N. Y., a corporation of Delaware Application June 28, 1946, Serial No. 679,898

3 Claims. (Cl. 23—1)

This invention relates in general to an improved method and apparatus for effecting contact between finely divided solids and a gas or gaseous mixture, and particularly to improvements in that type of method and apparatus for effecting such contact wherein the finely divided solids are maintained in a reaction zone in a highly turbulent fluidized state while a stream of gas, vapors, or mixtures thereof is passed upwardly through the reaction zone.

More particularly, the invention is directed to an improved method and apparatus for effecting separation of the finely divided solids from the gas or vapors after the desired degree of contact has been achieved. In general, the apparatus commonly employed for effecting such contact of gas and powdered material comprises one or more relatively large cylindrical vessels wherein the mass of powder is maintained in a highly turbulent state in contact with a rising gas stream for a sufficient residence time to effect the desired chemical or physical changes in either the powdered material or the gas. It is not unusual for such vessels to be of considerable size, for example, having a diameter of ten to forty feet, and a vertical height in the order of twice the diameter. The present invention, however, is not limited in its application to vessels of such extreme proportions and, in a proper case, it may be applied to vessels in the order of one foot in diameter. Regardless of size, the vessels generally employed for fluidized powder operations are normally of a volume considerably greater than that required for the dense fluidized mass of powdered material. This is especially true where it is desired to effect as complete a separation as possible of the gas and powder within the vessel itself.

Characteristic of fluidized powder systems of the type contemplated by this invention is the fact that the mass of fluidized powdered material within a vessel may be made to undergo a phase separation comprising two separate and distinct phases or zones. The first of these phases is a relatively dense turbulent and fluidized mass of particles occupying the lower portion of the vessel and including all but a substantially minor portion of the powdered solids in the vessel. The second phase is a relatively diffuse or dispersed phase or zone occupying the upper portion of the vessel and including the solid particles that have been lifted from the dense phase by the action of the gas stream passing therethrough.

Between the two phases, that is the dense phase of high powder concentration and the dispersed phase of low powder concentration, there is a relatively narrow, clearly defined zone known as the interface, wherein the powder concentration changes somewhat abruptly from high to low. The zone immediately above the interface is known as the disengaging zone, wherein solid particles entrained in the vapors rising from the dense phase are disengaged therefrom and are permitted to settle back into the dense bed. In the disengaging zone, that portion of the fluidized mass which is in excess of the carrying capacity of the gas stream at its minimum velocity in the vessel settles to the interface, where it is returned to the dense phase.

The vertical disengaging distance required above the dense phase may vary within relatively wide limits, dependent upon the nature of the reaction taking place in the vessel, the average particle size of the solids material, and the linear superficial velocity of the gas stream, that is, the theoretical linear velocity of the initial gas stream through the vessel without correction for the volume occupied by the solid particles. Normally the necessity for providing sufficient linear gas velocity to maintain the dense bed of solid particles in a highly turbulent pseudo-liquid condition and the desirability of maintaining a high ratio of contact surface of the solids to volume of the dense phase mass dictates that the solid particles be of extremely small size, for example, in the order of about forty to four hundred microns for average particle size in the mixture.

Normally such fluidized powder systems are operated at superficial linear velocities and with solid particle sizes such that entrainment in the rising gas stream is unavoidable, and it is therefore, the usual practice to employ conventional separator means in addition to the disengaging space for removing entrained solid particles from the gas stream emerging from the dense phase. For example, cyclone separators may be employed for this purpose within or without the reaction vessel.

In any event, the vertical distance required between the top of the dense phase, that is, the interface, and the top of the vessel for sufficient disengagement of the powdered material is usually relatively great. In calculating the required vessel height for a particular installation, therefore, it is necessary to include in the overall vessel height the sum of the heights of the dense phase and the dispersed phase. It has been found that the required disengaging space, in the absence of any special means for disengaging the entrained powdered material, roughly approximates the diameter of the vessel. The height of the dense phase may vary in accordance with the superficial linear velocity of the gas stream passing upwardly through the vessel and the ratio of gas to powder in the feed line leading to the vessel. In systems of the overhead-drawoff type, wherein all the powdered material and the gas is drawn off through an outlet in the top of the vessel, and the gas and powder subsequently separated, the height of the dense bed for any given combination of gas and powder is solely a function of the aforementioned variables. In systems of the bottom-drawoff type, however, wherein the dense bed of powdered material is maintained in a highly turbulent suspended state in the rising gas stream without substantial entrainment therein, and the powder is drawn off through an outlet in the bottom of the vessel while the gas leaves the vessel through an outlet overhead, the height of the dense bed may be controlled independently of the superficial linear velocity of the gas stream and the ratio of gas to powder in the feed. For example, a valve in the powder drawoff line may serve to control the dense bed height by varying the drawoff rate in accordance with conditions in the vessel. In general, a range of five to fifteen feet for the height of the dense bed has been found to be preferable for most purposes.

It is a primary object of this invention to provide a method and apparatus for effecting contact between finely divided solids and a gas, or gaseous mixture, whereby separation of the powder from the gas is effected in a minimum period of time after the desired degree of contact has been obtained.

A further object is to provide a method and apparatus for effecting contact between finely divided solids and a gas, or gaseous mixture, in which separation of the solids from the vapors in the dispersed phase may readily be accomplished in a simple, efficient, and economical manner.

I have found that the foregoing objects may readily be obtained by causing the gases and entrained particles emerging therewith from the dense phase to be confined in a multiplicity of relatively narrow vertical paths, whereby the solid particles, which by their random motion are brought into contact with the surfaces defining said vertical paths, are caused to agglomerate in the comparatively stagnant film of gas adjacent said surfaces and to flow downwardly therealong back into the dense phase.

To attain the foregoing results I dispose a baffle having plurality of parallel vertical passages within the vessel, extending from a point within the interface, or slightly within the dense phase, upwardly to a point adjacent the top of the vessel.

The foregoing and other objects are effected by this invention, as will be apparent from the following description and claims taken in connection with the accompanying drawing forming a part of this application.

While the invention broadly contemplates the novel process and apparatus as being of general application in the chemical processing and oil refining arts, for a fuller understanding of the invention it will hereinafter be particularly described in connection with the fluid catalyst refining of hydrocarbon oils, as exemplified by the well-known fluid catalyst cracking system.

Fluid catalyst cracking systems normally employ large reactor and regenerator vessels in which finely divided catalyst powder is contacted with a rising stream of gas or gaseous mixture. In the reactor, the hot catalyst powder is maintained as a dense fluidized bed while the stream of hydrocarbon vapors is passed upwardly therethrough to effect the desired hydrocarbon conversion. In the regenerator, spent or carbonized catalyst powder which has been withdrawn from the reactor is maintained as a dense fluidized bed while a stream of oxygen-containing gas is passed upwardly therethrough to burn off the carbon which had been deposited on the catalyst as a contaminant in the reaction zone. In both reactor and regenerator the catalyst powder is separated into a dense phase and a dispersed phase, and in either case it is desirable to disengage the catalyst powder from the hydrocarbon vapors in the dispersed phase in a minimum period of time or, in other words, to keep the vertical height of the catalyst disengaging zone as low as possible.

The invention will be more readily understood from an inspection of the accompanying drawing, in which:

Fig. 1 is a section in elevation of a vessel in a fluidized catalytic cracking system embodying an improved baffle arrangement disposed substantially entirely in the dispersed phase; and Fig. 2 is a section taken along the line 2—2 of Fig. 1.

Referring to the drawing, the numeral 11 represents a vessel which might be either a regenerator or a reactor, but for the purpose of illustrating the invention it would be considered as being a typical fluid catalyst reactor. Within the vessel 11 is a contact zone 12 wherein a mass of fluidized catalyst is contacted with a stream of hydrocarbon vapors. At a point adjacent the bottom of the vessel an inlet nozzle 13 is provided through which a mixture of hydrocarbon vapors and powdered catalyst is injected into the contact zone. Nozzle 13 extends within the contact zone and terminates in a distributor plate 14 by means of which the catalyst-hydrocarbon vapor mixture may be evenly distributed within the dense phase zone. The catalyst-hydrocarbon vapor mixture is preferably introduced into the contacting zone at the desired reaction temperature, which for a cracking operation should be in the range of about 800°–1050° F. and, preferably, temperatures from about 900°–1000° F. may be used. The hydrocarbon stream is supplied under pressure, and preferably in a preheated condition, through conduit 15, connected to a source not shown. The powdered catalyst is injected into the hydrocarbon stream of conduit 15 through conduit 16, controlled by valve 17. The powdered catalyst may be supplied as revivified material from a regenerator, not shown. The temperatures of the catalyst in conduit 16 and the hydrocarbon vapors in conduit 15 are so controlled that the mixture thereof in the desired catalyst-oil ratio will produce a temperature in the stream injected into the contact zone within the preferred cracking temperature range. The catalyst to oil ratio may be in the order of five to twenty pounds of catalyst per pound of oil. The injection of the catalyst-hydrocarbon vapor mixture into the contact zone 12 from distributor 14 causes the catalyst to assume a highly turbulent fluidized condition within the vessel. The catalyst in the contact zone undergoes a phase separation, dividing into a dense phase 18 and a dispersed phase 19 separated by the interface 20. As previously stated, the level of the interface 20 for an overhead-drawoff system is dependent upon the catalyst-oil ratio in the feed line, the superficial linear velocity of the gas stream passing upwardly through the contact zone, and the kind of gas and powder. In a bottom-drawoff system, as illustrated in the drawing, the level of the interface is controlled by the rate of powder withdrawal.

The interface 20 between the dense phase 18 and the dispersed phase 19 is preferably maintained as a sharply defined narrow zone, in which case it has been found that catalyst entrainment is at a minimum. It has been observed that in vessels of large diameter the interface is less sharply defined, so that considerable entrainment of the catalyst occurs. The amount of space required for catalyst deentrainment, therefore, is proportionately large, so that the vessel height is materially increased.

The present invention is concerned with the problem of securing the advantages of large vessel diameter within the dense turbulent phase while at the same time acquiring the advantages to be derived from small vessel diameter within the dispersed phase or disengaging zone.

To this end, I provide a baffle 21 within the dispersed phase 19 which comprises a honeycomb or egg-crate type of structure providing a multiplicity of parallel vertical passages 22. The baffle 21 extends from a point substantially at the upper level of the dispersed phase to a point near the top of the vessel. Since, under any given set of operating conditions there exists a minimum catalyst concentration which would be attained even with a very great disengaging height, the baffle is made of sufficient height to deentrain all the catalyst particles which may normally be returned to the dense bed by this method. The small quantity of fines which normally are not capable of separation by this means are carried overhead through the gas outlet 23 and are passed by a conventional separating means, not shown, for separation of the gas from the catalyst and complete recovery of the latter.

Since the upper level of the dense phase in an overhead-drawoff system for any given oil and catalyst is determined by the catalyst-oil ratio in the feed line and the superficial linear gas velocity in the vessel, slight variations in the magnitude of these factors will cause fluctuations in the dense phase level, so that, for efficient operation in view of unavoidable variations which may occur in such systems, it is preferred to have the lower edge of the baffle 21 extending a slight distance within the dense phase. In bottom-drawoff systems, however, the dense phase level is determined by the rate of catalyst withdrawal, so that it is possible to maintain the dense phase level substantially at the lower edge of the baffle.

I have illustrated baffle 21 as comprising a plurality of light-gage metal members arranged vertically and parallelly to form a checker-board pattern of flow paths each of rectangular horizontal cross-section. It is obvious, however, that the provision of a multiplicity of vertical flow paths of relatively small cross-sectional area does not require the particular configuration illustrated, and that equally satisfactory results might be obtained with other arrangements in which a considerable area of vertical path-defining surface is provided. I may, for example, find it advantageous in a particular application to provide a plurality of vertical tubes in closely nested arrangement with the catalyst stream traveling in contact with the inner tube surfaces, the outer tube surfaces, or both.

At the base of reactor 11 a nozzle 24 is provided through which contaminated catalyst from the dense phase 18 may be continuously withdrawn at a rate sufficient to maintain the upper level of the dense bed of catalyst at the desired height. A control valve 25 in the outlet conduit 26 may be used to control the catalyst bed level in the contact zone. The conduit 26 may be connected to the inlet nozzle of a catalyst regenerator, not shown. Since the apparatus required for the proper conditioning of the catalyst and oil prior to injection in the reaction zone and for the subsequent treatment of the reacted effluents and the contaminated catalyst withdrawn therefrom forms per se no part of the present invention, it is not deemed necessary to illustrate the same in the drawing. In the illustrated embodiment of the invention a bottom drawoff type of vessel has been shown, wherein the catalyst is both supplied to and discharged from the contact zone at points adjacent the bottom thereof.

The present invention is especially adapted for use in vessels of the bottom drawoff type, wherein it is desired to deentrain as much as possible of the catalyst carried into the dispersed phase, so that the mass of catalyst may be maintained as a turbulent pseudo-liquid bed suspended in the gas stream without substantial mass movement therewith through the vessel.

By employment of the method and apparatus of this invention, I have found that the usual allowance of a disengaging space above the dense phase approximately equal in height to the diameter of the vessel may be materially lessened. The saving in vertical space may amount to as much as forty per cent of that required in the absence of any baffle. The savings thus effected in the overall vessel height are reflected in lowered requirements for supporting structure. The general compactness in the vessel attained by this invention will result in more economical construction.

What I claim is:

1. A process for effecting contact between a finely divided solid contact material and a gas which comprises introducing the finely divided material into a contact zone, passing the gas upwardly through the finely divided material at a velocity adapted to maintain two distinct zones of concentration of the finely divided material in said contact zone, said zones being a lower dense phase of pseudo-liquid characteristics and an upper dispersed phase, passing the gas exiting from the top of the dense phase directly through a multiplicity of elongated vertical confined passageways extending upwardly through said second phase, and withdrawing the gas from the contact zone at an upper portion thereof.

2. A process for effecting contact between a finely divided solid contact material and a gas which comprises introducing the finely divided material and the gas into the lower portion of a contact zone, passing the gas upwardly through the finely divided material at a velocity adapted to maintain two distinct zones of concentration of the finely divided material in said contact zone, said zones being a lower dense phase of pseudo-liquid characteristics and an upper dispersed phase, passing the gas and entrained solids material exiting from the top of the dense phase directly through a multiplicity of elongated relatively narrow channels extending upwardly through said dispersed phase, and withdrawing the gas from the contact zone at a point adjacent the upper ends of said channels.

3. A process for effecting contact between a finely divided solid contact material and a gas which comprises introducing the finely divided material and the gas into the lower portion of a contact zone, passing the gas upwardly through the finely divided material at a velocity adapted to maintain two distinct zones of concentration of the finely divided material in said contact zone, said zones being a lower dense phase of pseudo-liquid characteristics and an upper dispersed phase, passing the gas and entrained solids material exiting from the top of the dense phase at substantially unreduced velocity directly through a multiplicity of elongated channels subdividing the cross-section of the entire contact zone and providing for a predetermined vertical distance within said dispersed phase a considerably increased vertical surface contact area for the finely divided turbulent particles, withdrawing the gas from the contact zone at a point adjacent the upper ends of said channels, and continuously withdrawing catalyst from the contact zone at a point in the lower portion of said dense phase.

GEORGE D. CREELMAN.

REFERENCES CITED

The following references are of record in the file of this patent:

UNITED STATES PATENTS

| Number | Name | Date |
|---|---|---|
| 1,845,058 | Pier | Feb. 16, 1932 |
| 2,359,310 | Hemminger | Oct. 3, 1944 |
| 2,410,891 | Meinert et al. | Nov. 12, 1946 |